US009141172B1

(12) United States Patent
Leung et al.

(10) Patent No.: US 9,141,172 B1
(45) Date of Patent: *Sep. 22, 2015

(54) METHOD AND APPARATUS TO MANAGE AND CONTROL A POWER STATE OF A DEVICE SET BASED ON AVAILABILITY REQUIREMENTS OF CORRESPONDING LOGICAL ADDRESSES

(71) Applicant: EMC Corporation, Hopkinton, MA (US)

(72) Inventors: Andrew W. Leung, Pleasanton, CA (US); Kevin M. Greenan, Santa Cruz, CA (US); Windsor W. Hsu, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/488,278

(22) Filed: Sep. 16, 2014

Related U.S. Application Data

(63) Continuation of application No. 13/436,778, filed on Mar. 30, 2012, now Pat. No. 8,862,923.

(51) Int. Cl.
G06F 1/00 (2006.01)
G06F 1/32 (2006.01)
G06F 17/30 (2006.01)
G06F 3/06 (2006.01)
G06F 12/02 (2006.01)

(52) U.S. Cl.
CPC .............. *G06F 1/3234* (2013.01); *G06F 1/32* (2013.01); *G06F 1/3203* (2013.01); *G06F 3/0607* (2013.01); *G06F 17/3007* (2013.01); *G06F 12/0246* (2013.01)

(58) Field of Classification Search
CPC ....... G06F 1/3203; G06F 1/32; G06F 3/0607; G06F 12/0246; G06F 12/0866
See application file for complete search history.

(56) References Cited

U.S. PATENT DOCUMENTS 7,165,059 B1 * 1/2007 Shah et al. ............................ 1/1
7,334,144 B1 * 2/2008 Schlumberger ............... 713/320
7,844,845 B2 11/2010 Chen et al.
(Continued)

OTHER PUBLICATIONS

Kevin M. Greenan et al., U.S. Appl. No. 13/436,771, filed Mar. 30, 2012, 24 pages.

(Continued)

*Primary Examiner* — Jaweed A Abbaszadeh
*Assistant Examiner* — Gayathri Sampath
(74) *Attorney, Agent, or Firm* — Blakely, Sokoloff, Taylor & Zafman LLP

(57) ABSTRACT

A method and apparatus to control and manage a power state in a related set of storage devices is described. In one example a method includes, determining an idleness measure at the file system, the idleness measure indicating availability requirements of the device set, and setting an idle state based on the idleness measure. The method also includes receiving the idle state setting at the storage subsystem, determining whether the idle state setting is different from a current state of the device set, determining whether to change the idle state of the device set if the idle state setting is different from the current state of the device set, the determining being based on information about the device set. The method also includes commanding the device set to change the current idle state to correspond to the idle state setting based on determining whether to change the idle state.

19 Claims, 6 Drawing Sheets

(56) References Cited

U.S. PATENT DOCUMENTS

| | | |
|---|---|---|
| 7,852,582 B2 | 12/2010 | Ermolov et al. |
| 8,135,907 B2 | 3/2012 | Moore et al. |
| 2005/0174678 A1 | 8/2005 | Zayas et al. |
| 2007/0005666 A1* | 1/2007 | Klein et al. .................. 707/203 |
| 2008/0229131 A1 | 9/2008 | Kono et al. |
| 2009/0013203 A1 | 1/2009 | Chen et al. |
| 2009/0128942 A1 | 5/2009 | Ermolov et al. |
| 2009/0164822 A1 | 6/2009 | Yasui et al. |
| 2009/0327602 A1 | 12/2009 | Moore et al. |
| 2010/0121892 A1* | 5/2010 | Matsumoto et al. .......... 707/822 |
| 2010/0122200 A1 | 5/2010 | Merry et al. |
| 2010/0151130 A1 | 6/2010 | Ammerlaan et al. |
| 2010/0235553 A1 | 9/2010 | Zimoto et al. |
| 2011/0060927 A1 | 3/2011 | Fillingim et al. |
| 2012/0054516 A1 | 3/2012 | Shayer |
| 2012/0254640 A1* | 10/2012 | Agarwala et al. ............. 713/320 |
| 2012/0303990 A1 | 11/2012 | Nanda et al. |

OTHER PUBLICATIONS

Non-Final Office Action, U.S. Appl. No. 13,436,771, dated Sep. 24, 2014, 7 pages.

\* cited by examiner

METHOD AND APPARATUS TO MANAGE AND CONTROL A POWER STATE OF A DEVICE SET BASED ON AVAILABILITY REQUIREMENTS OF CORRESPONDING LOGICAL ADDRESSES

CROSS-REFERENCE TO RELATED APPLICATIONS

This application is a continuation of application Ser. No. 13/436,778, filed Mar. 30, 2012, which is hereby incorporated by reference.

FIELD

Embodiments of the invention relate to the field of managed storage devices; and more specifically, to transitioning a set of storage devices between power states.

BACKGROUND

A digital data archival storage system stores large amounts digital data on some type of media. For faster data ingest, easier management, and quick retrieval presently hard disk drive arrays are used. Hard disk drives consume power when running and are subject to mechanical wear in the motors used for spinning the disks and for driving read and write heads. In addition, the mechanical activity of the motors and the drives produces heat. Additional energy is used to cool the drives. Some disk drives can be operated at different spin speeds. Higher speeds provide faster read and write operations, while lower speeds use less power and produce less heat. Some disk drives also have a standby state in which the disk stops spinning but the hard disk drive controller is still powered to receive read and write requests. Other types of mass digital storage devices have different reliability and latency characteristics but typically are affected by power cycling and low power modes.

Power consumption can be minimized by simply shutting down the hard disk drives whenever they are not in use. However, this first causes delays when accessing the disks because the disks must first spin up to full speed before being accessed. This can take as much as a minute. Second, turning the disk drives on and off increases the wear on the disk drive's mechanical system and makes a drive failure more likely. Reliability of the drives can be compromised if devices are put into a low-power or power-down state too often or for long periods of time.

A common power-management operation in storage systems is placing the storage devices into a low-power mode. Low-power mode can mean reducing spin speed and supply voltages, turning specific components in the drive off, or turning an entire hard disk drive off. Powering-off components within a storage device or powering-off the entire storage device can reduce the operational life of the device. In addition, leaving a storage device powered off for an extended period of time can also reduce the operational life and reliability of the device. As a consequence, storage device power management and reliability are at odds with one another.

One power management approach is to power down devices and to ensure reliability by periodically scrubbing each device individually. Spun-down disks are periodically activated and a small amount of data is read off the drive to check drive health. If the drive is deemed unhealthy, it can be proactively failed or it can be designated as not healthy enough for power management. Any read errors occurring during the scrub can be automatically fixed using intra-disk parity. This approach focuses on the health of individual drives and the cross-disk data integrity checks to test data integrity are typically done offline.

SUMMARY

A method and apparatus to control and manage a power state in a related set of storage devices is described. In one example a method includes, determining an idleness measure at the file system, the idleness measure indicating availability requirements of the device set, setting an idle state based on the idleness measure, receiving the idle state setting at the storage subsystem. determining whether the idle state setting is different from a current state of the device set. determining whether to change the idle state of the device set if the idle state setting is different from the current state of the device set, the determining being based on information about the device set, and commanding the device set to change the current idle state to correspond to the idle state setting based on determining whether to change the idle state.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1A:
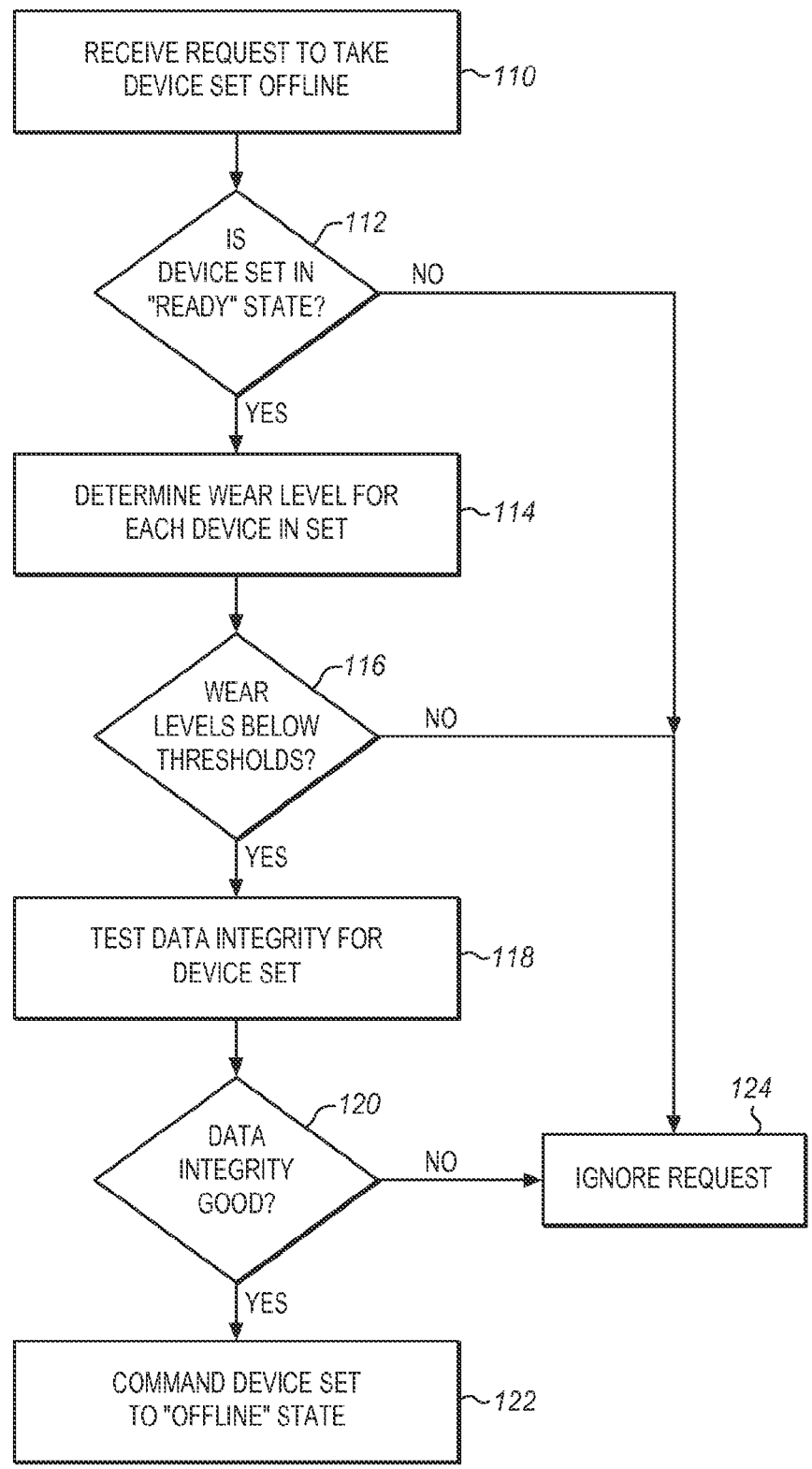
FIG. 1A is a process flow diagram of transitioning a device set from an online state to an offline state according to one embodiment of the invention.

In the following description, numerous specific details such as logic implementations, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Controlling and managing power-state in an archival storage system can be improved with a more effective trade-off between power savings, performance, and reliability. Such a system should provide power savings whenever possible by powering down storage devices as well as provide good performance and limited reliability impact by ensuring the devices are not often powered down when they are accessed and are not power cycled too often to increase device wear. Reliability can be compromised by placing devices into low power and power-down modes.

A power-managed archival system can be described as having three conflicting goals. First, the storage devices in the system should be placed into a low-power mode as much as possible. Second, the file system data must be predictably available. However, data is not available in the low power mode. That is, the system should wake-up storage devices in the storage subsystem for pending I/O requests coming from the file system. Third, the power management in the storage subsystem should monitor the devices to ensure reliability is maintained. However, monitoring can slow down the handling of I/O requests.

In one embodiment, a related set of power managed storage devices are exercised and managed. First, the condition of an entire device set or sets of device sets is checked and maintained together. As a result, correlated failures (e.g. multiple drives from a bad batch) are discovered and the health of the dataset stored on the set of devices is ensured. In addition, the device set may map to a more meaningful set of data, such as a RAID (Redundant Array of Inexpensive Disks) array, that allows a determination as to what degree the data is failed or the impact of that failure, such as corrupted user data or unused space.

Second an exercise process is used to govern how the disks are powered on and off. If the exercise process deems the disk set unfit for power management, it will prevent the entire set of disks from going into a low-power mode. A disk set may be deemed unfit for many different reasons. A disk may be unfit, for example, if it has been powered-off too many times, if there is a pending reconstruction of the data on the disk, if there are too many data stripe repairs during the exercise of the disk, or if SMART (Self Monitoring, Analysis, and Reporting Technology) data on one or more drives indicates a problem with data's integrity.

Third a data integrity check may be performed on-line, at the data stripe granularity. This provides highly reliable corruption detection and inline corruption correction. Rather than delaying a portion of the integrity check to accommodate other activity, immediate action is taken to help maintain device and data invulnerability.

In another embodiment the power state of an archival system is managed and controlled when multiple entities in the storage stack share information and control in order to best achieve these power management goals. One or more file system components may be used to manage the idleness of data and inform the underlying storage subsystem that data is not likely immediately needed. This idleness information tells the storage subsystem whether or not power management can safely be applied to the devices associated with this dataset or file. The subsystem, which controls and manages the physical devices, may then use reliability information, internal subsystem state, and device characteristics to decide when to power down devices and reduce the impact on performance and reliability.

When a single system entity is used to manage and control device power, the information available to that single system entity is limited. The single entity cannot track idleness at a per-device level, but only at the dataset level because at the per-device level, the single entity has no file system input. As a result, the correlations that a file system can provide regarding the idleness of datasets often cannot be translated to the potential idleness of an individual device. As a result devices that may soon be needed may be powered down. This increases request latency and wear. The shared information from the multiple entities allows file system and subsystem information to effectively be used to balance power, reliability, and performance.

The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Referring to FIG. 1, in the illustrated embodiment, a related set of storage devices, called a device set, can be placed in a low-power mode when a higher-level process requests that the devices be powered down. A storage subsystem manages the transition using one or more checks. These checks also allow for the health of a device set that has been placed in low-power mode to be determined before it is transitioned into a powered-on state.

The term device set is used here to describe a collection of data storage devices connected via one or more datasets. A dataset may include the data and metadata of an entire file system or a logical entity used by many file systems. The health of the device set is determined by the current state of each device, the historical statistics of each device, and the historical statistics of the device set, among other factors.

A device set can be in one of at least three different states: online, offline, or unavailable online. The device set is in an online state when all of the devices in the set are energized and accessible. The device set is offline when all of the devices are in a low-power mode. The device set is unavailable online when one or more of the devices are energized and the data stored in the set is not accessible. The low power mode may be used when the devices are powered off, when the devices are in a standby state, or when the devices are in a special low power state.

FIG. 1A is a process flow diagram for transitioning a device set from an online state to an offline state. In brief, the device set can be transitioned from an online to an offline state after all of the following checks pass: first, the device set is in a "ready" state; second, the device set as a whole is in good health; and third, the devices in the device set are functional and serve the correct data.

As shown in FIG. 1A, at 110 a storage subsystem receives a request to take a device set offline. The request may come from a file management system, a power management system or any other part of a data storage system. The storage subsystem at 112 then examines the status of the affected device set to determine its operational status. If the device is not in a ready state then it will not be taken offline at 124. The device set is in a "ready" state, for example, if no devices are receiving I/O (Input/Output) and there are no pending reconstructions. Reconstructions occur when a data is being loaded onto a device from another device in the same or another dataset such as in a failure recovery or a replacement of a faulty device with a blank device. Reconstructions may also occur as part of a maintenance routine.

At 114, the storage subsystem determines if the device set as a whole is in a condition to be placed in low-power mode. This can be done by reading for each device of the device set at the device level and also by reading statistics for the set at the device set-level. The statistics can include many different device and set characteristics such as the power state transitions over a particular period of time and for the life of a device and the number of service hours for each device. These statistics can be compiled by the storage subsystem for each device set that is controlled by the storage subsystem. The particular type of data that is used will depend on the nature of the particular storage device. For solid state memory, for example, power cycles are less important as an indication of wear than as an indication of the number of write cycles. For hard disk drives, the number of read cycles is less important as a measure of wear than events which affect the motors and bearings of the spindle and write head.

These and other usage statistics can also be obtained by reading SMART data or a similar type of data for each device. SMART data is typically stored in registers of a hard drive controller that is a part of each device. This data is readily available while the controller is powered on and can be accessed when desired. The data can also be periodically collected and compiled in a register or in registers at the storage subsystem. This allows the data to be accessed more quickly when needed and it allows the data to be accessed for devices that have powered down or have failed.

If the statistics fall within reasonable thresholds at 116, then the check passes. The thresholds may be those provided by manufacturers of each device or they may be independently determined or adjusted based on experience. This is a wear test to determine how much wear is left in the device set as a whole. If any device in the set or the set as a whole is near the end of life, then the storage subsystem may reject the offline request at 124. By shutting down the device set, there is a risk that it may not successfully turn back on and the data stored thereon may be lost. If the thresholds are met, then the storage subsystem moves to the next test.

At 118, the storage subsystem determines if the devices in the device set are functional and serve the correct data. The system reads a sample of data off all or most of the devices in the device set and verifies the integrity of the data. Any inconsistencies in the data can be corrected during this process. The data integrity check at 118 may be over the entire device set, not just each device in the device set. The integrity check may require the entire set of devices in the device set in order to determine if the device set as a whole is able to return correct data. To determine if the data reads correctly any of a variety of different techniques may be used. In some cases, the data will be associated with an error detection or an error correction code on the same device. The samples of data can then be compared against the codes to determine if the data is correct. In some cases, redundant copies of the data may be stored on another device in the same or another device set. The copies can be compared directly or using parity or a checksum or some other detection approach to determine if the two reads match. Other approaches may be used depending on the particular implementation.

At 120, if the data reads succeed and the data is properly verified, then the devices are functional and the data test is passed. The storage subsystem then honors the offline request and at 122 commands the device set to go to an offline state. If this test is not passed, then the request is ignored again at 124. The specific type of offline state may be adapted to suit any particular implementation. For some systems, the offline state may be a powered off state. For other systems, there may be intermediate offline states. For hard disk drives, it may be desired to lower the disk speed without turning the disks completely off. This reduces the risk of an unrecoverable error but requires more power. In one embodiment, the storage subsystem selects an appropriate offline state using the wear statistics gathered at 114.

Figure 1B:
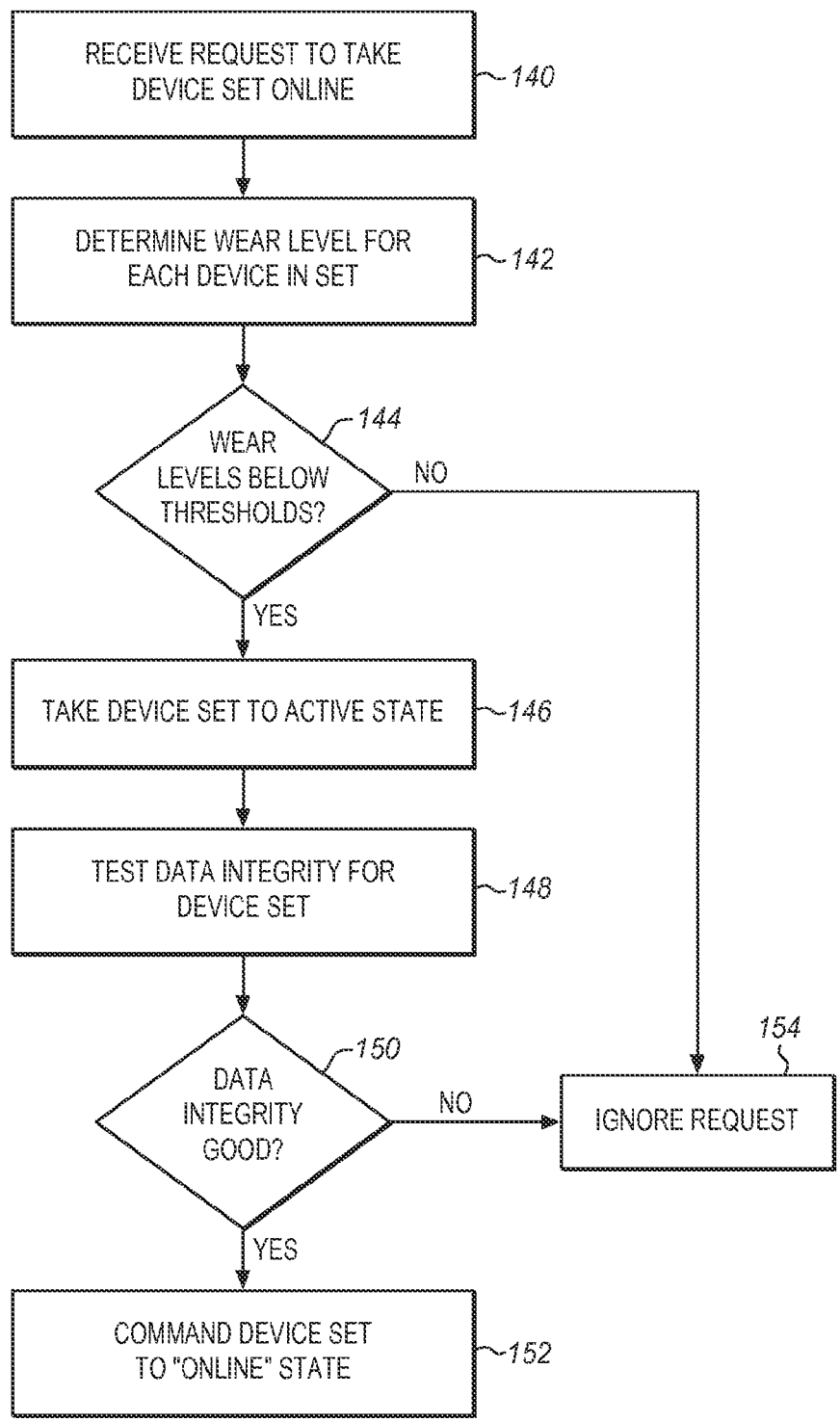
FIG. 1B is a process flow diagram of transitioning a device set from an offline state to an online state according to one embodiment of the invention.

FIG. 1B is a process flow diagram of transitioning from on offline state to an online state. At 140, a storage subsystem receives a request to take a device set online. This may be from a file system in order to allow a read or write operation or it may be for maintenance or other reasons. At 142, wear level is determined for the devices. This may be done using statistics that have been previously collected from the devices in the device set or from data about the set that has been tracked by the storage subsystem. Both device level and set level data may be used. If device level data is used and the devices are powered off, then a previously collected copy of the data may be used or, with some devices, a controller of a device can be powered on without powering on the drive so that wear data, such as SMART data, can be read from the device.

At 144, if the statistics fall within reasonable thresholds, then the check passes and the process moves to power up the device set at 146 and then perform the next check at 148. If the wear and use statistics are beyond the threshold levels, then the request may be refused at 154.

At 146, the devices are powered up and at 148 the storage subsystem determines if the devices individually and the device set as a whole are functional and serve the correct data. If data read from the devices is verifiable at 150, then the devices are deemed to be functional and at 152 the device set is taken online. If the data is not verifiable then at 154 the devices are placed into an unavailable online state.

Figure 2:
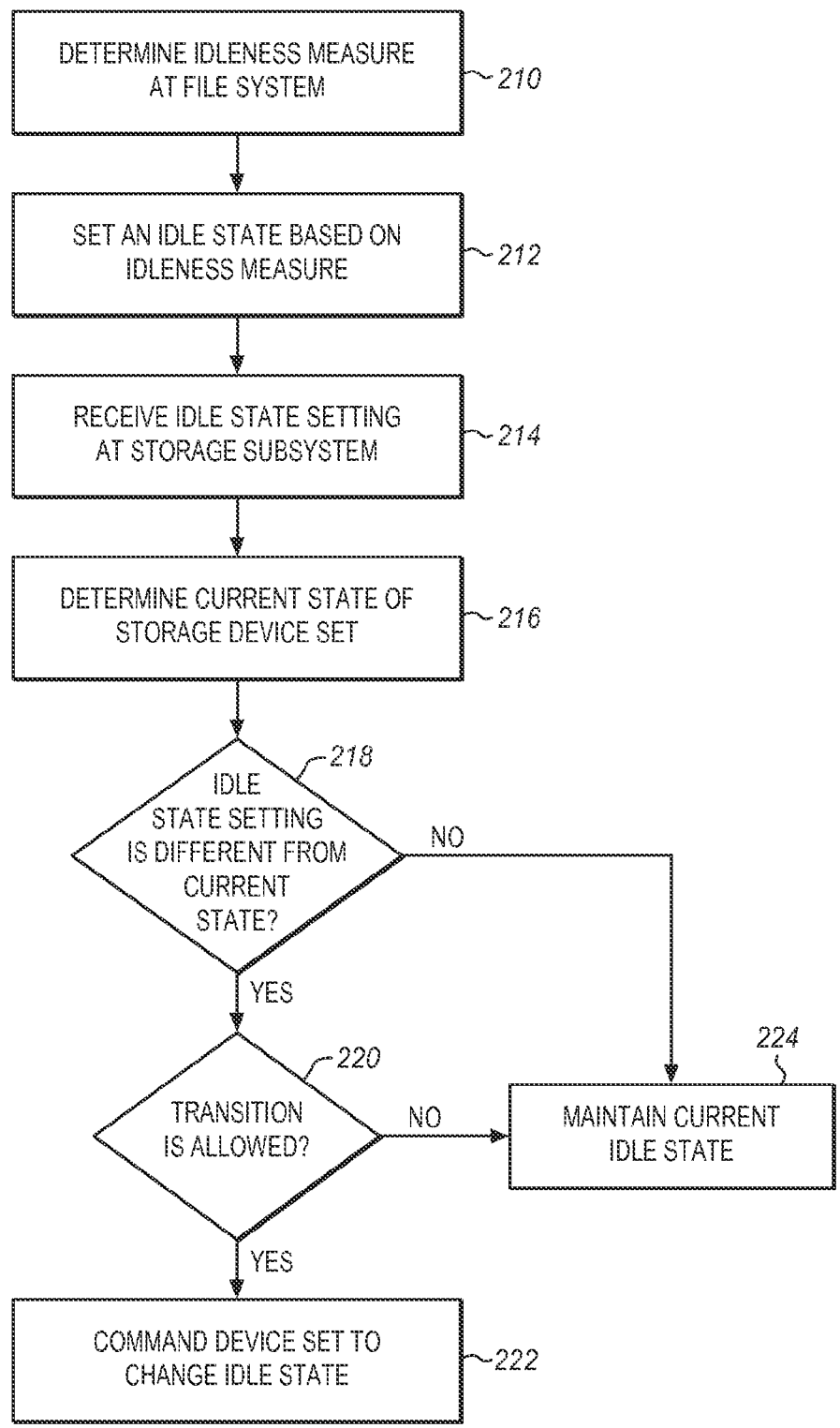
FIG. 2 is a process flow diagram of a power management interaction between a file system and a storage subsystem according to one embodiment of the invention.

FIG. 2 shows another embodiment of a process flow of the invention which involves an interaction between two components of a power-managed archival data storage system, a file system and a storage subsystem. The file system provides a user interface to files and file data, while the storage subsystem serves as a reliable data store for the file system. The storage subsystem contains the devices and management needed to serve file system I/O requests. The storage subsystem is capable of serving multiple file systems and datasets at once. In addition, a file system may have access to more than one storage subsystem.

As shown in FIG. 2, the present system provides mechanisms to reliably provide power-management, with predictable data availability, in an archival storage system. The information and functionality used to do so is pooled from the file system and the storage subsystem, as well as, possibly other components in the storage stack.

A shared communication channel or data structure between the file system and storage subsystem may be used to communicate a current state of the storage subsystem. There are two types of states. The current state is the actual state of a device set as controlled by the storage subsystem. There is also an intended state that is requested by the file system.

Some form of IPC (Inter-Process Communication) or any other suitable approach may be used to signal a change in either state. For the file system, the requested states may be online or offline. This depends on whether there are current or anticipated I/O operations for a particular address range. For the storage subsystem the current state may be either online, if the devices are all active and ready to serve, offline, if the devices are all in a low-power mode, or unavailable and online, if one or more devices are active, but not ready to serve, due to maintenance, some other background process, or failure, for example.

Referring to FIG. 2, the file system may determine an idleness measure at 210, to determine the availability requirements of a device set or an address range. The file system can effectively monitor idleness because user data requests and access patterns are most visible at the file system. If the file system estimates that the workload will remain idle for an extended period of time and if the current state of the storage subsystem is online, then the file system may set the desired or requested state of the shared data structure to offline at 212. Setting the requested state to offline informs the storage subsystem that the file system does not expect any I/O requests in the immediate future. Alternatively, the file system may set a power state request based on a request from a higher level process, such as an application, an operating system, or a power control system.

If the current state of the storage subsystem is offline and the file system either has pending I/O requests or estimates that pending I/O requests will arrive soon, then the file system at 212 will set the requested state to online. Setting the state to online informs the storage subsystem that the file system either must service an I/O request immediately or that the storage subsystem should prepare for expected I/O to requests. Preparing a storage device set in advance of actual need reduces latency when the requests arrive.

In order to predict whether I/O requests are likely or not likely in the near future, the file system may use any of a variety of approaches or combinations of these approaches. If the file system has visibility into currently running processes, then the processes may be characterized as requiring frequent I/O or not requiring frequent I/O. Other deterministic approaches may also be used. In a simpler approach, the file system can look at an instruction stack to determine whether any I/O operations will be generated soon. In another approach, the file system may track I/O activity and make an estimate based on the history. In still another approach background processes and a time threshold for requests can be monitored. If there have been no requests for the duration of the time threshold and there are not background processes running, then a state transition can be triggered.

At 214, the storage subsystem receives the requested idle state from the file system. The state may be received by checking a register accessible to both the file system and the storage subsystem or by receiving a direct request, through an alert, an interrupt, or an IPC. At 216, the storage subsystem determines the current state of the relevant storage device set. If there are more than one device set serving the file system, then the storage subsystem may refer to address ranges, account setting or some other indication of which storage subsystem is affected.

At 218 if the requested idle state is the same as the current idle state, then the process ends at 224 and the idle state is not changed. On the other hand, if the requested idle state is different from the current idle state, then the storage subsystem will determine whether it will allow the requested transition at 220.

The storage subsystem has device specific information that is layered below the level of the file system and is therefore not accessible to the one or more file systems or datasets that the storage subsystem may be serving. This data may include a reliability measure based on individual drive SMART data, historical error data, and current drive state. The storage subsystem also has access to the device set level statistics described above. Additionally, the subsystem may have information regarding drive access patterns, such as RAID reconstructions or data scrubbing.

If the requested state is changed and the requested state differs from the current state of the storage subsystem, then at 220 the storage subsystem will decide if a state transition is appropriate. The subsystem is able to effectively know when a device is capable of being power managed because it has efficient access to individual device reliability data to ensure the proper wearing of the device. It can also access device power efficiencies and power up latencies to provide better power savings and performance. The process of determining whether to allow the transition may be the same as that of FIG. 1A or 1B or it may be a different process.

If the transition is allowed, then at 222, the device is commanded to change its idle state. This may be a transition from offline to online, a transition from online to offline, a transition from online unavailable to online, or a transition from offline to unavailable online. If the transition is not allowed at 220, then the current idle state is maintained. The current state is also maintained if a requested state is offline and the current state is online unavailable, then a transition will not be made until after the background process that is making the device set unavailable is completed.

Figure 3:
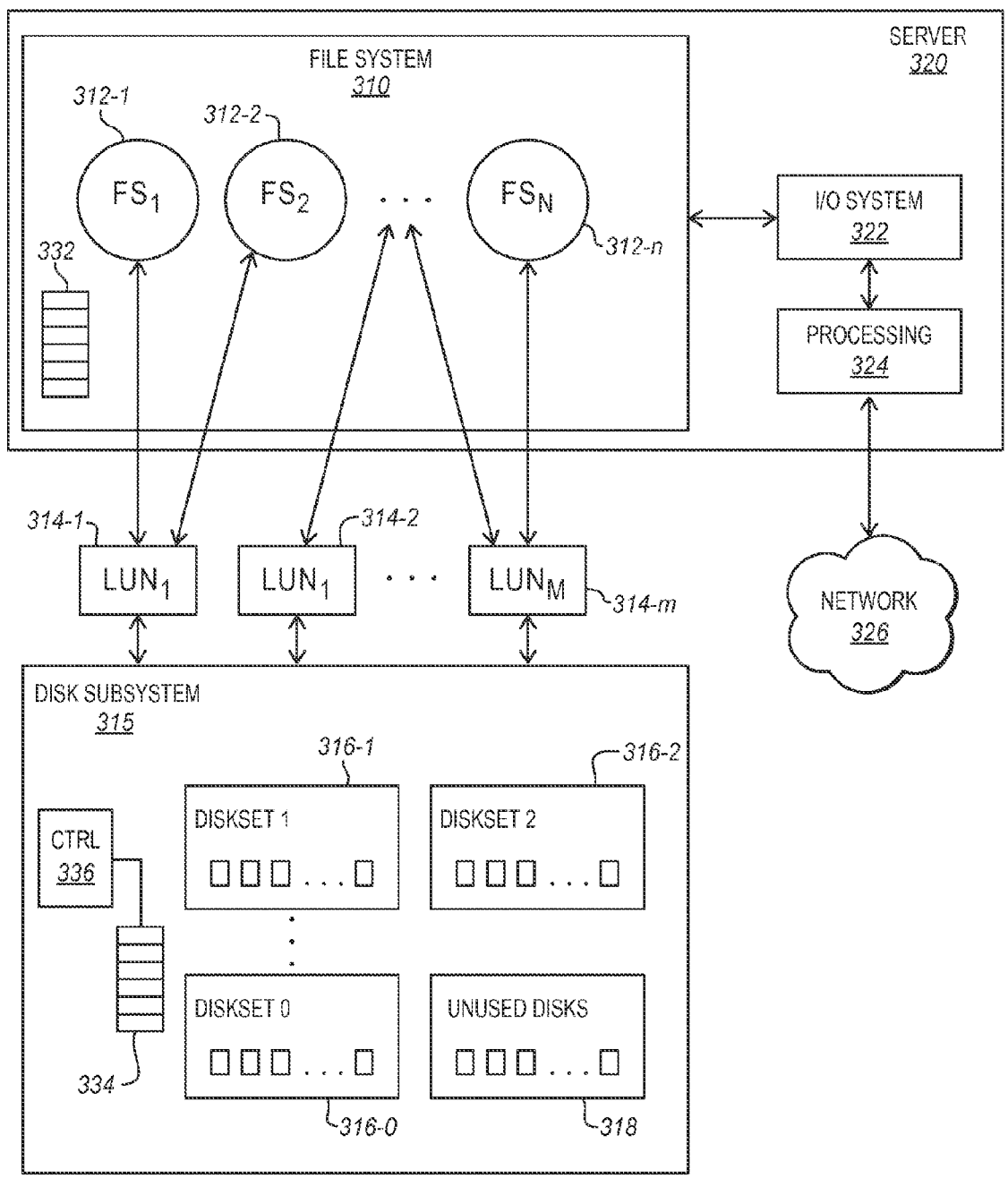
FIG. 3 is block diagram of an example files system and storage subsystem according to one embodiment of the invention.

FIG. 3 is a block diagram of an example of a file system and a storage subsystem suitable for use with the present application. The file system 310 is coupled through one or more LUNs (Logical Unit Numbers) 314 to a storage disk subsystem 316. The file system may be a collection of independent file system modules 312-1, 312-2, . . . 312-$n$ each coupled to one or more different LUNs 314-1, 314-2, . . . 314-$n$ through to one or more disk sets 316-1, 316-2, . . . 316-$o$.

The disk sets are referred to above also as sets of storage devices. While they are shown as disks here, the storage may be of any of a variety of different types, depending on the implementation. As shown each disk set contains multiple disks for storing data. The number of file system modules may be the same or different from the number of LUNs and the number of disk sets. There is also an unused disk set 318 which may be reserved for backup or some of the disks may form a logical part of another one of the disk sets. The disk sets may each correspond to a group of drives contained in a separate enclosure. Alternatively, each disk set may be grouped logically and not physically, so that the disks may or may not be nearby or even at the same site.

The file system 310 may be part of a larger server 320 for an archival data storage system. The server would have an I/O system 322 to interface with the file system that is also coupled to processing resources 324. The storage resources of the disk subsystem 315 allow the server to serve and store data in response to the tasks that it performs with it processing resources. The server may be coupled through a network interface 326 to external clients or content creators to perform a variety of I/O operations on behalf of the clients. Rather than a server, the system 320 may be supercomputer, workstation, or archival data storage system.

The file system 310 may include its own set of status and history registers 332 or it may use storage resources of the processor 324 or other memory of the server. These registers may be used to write idle state values and to track I/O requests. The disk subsystem similarly includes one or more sets of data storage registers 334 to store monitoring data from each of the storage devices and for each disk set as well as to store idle states and other data used by the disk subsystem. Depending on the particular implementation, the disk subsystem may also include its own processing resources in a controller 336 that determines device health, runs integrity checks, and controls the operation and status of each of the disk sets. The controller may contain memory, software, and execution units in a single device, or it may include multiple devices.

While the embodiments of the invention are described with reference to a file system, the nomenclature and particular connections provided in the figures are intended as examples. The file system represents a higher level system that processes reads and writes from memory and uses logical addresses to control these I/O operations. The storage subsystem receives the logical addresses from the file system or after being interpreted by an intermediary device and then applies those to physical addresses on specific storage devices. While the file system manages I/O from the perspective of processes on a device. The storage subsystem manages I/O from the perspective of physical memory locations. The particular position and manner in which these two functions are implemented may be modified to suit a variety of different storage systems and architectures.

Figure 4:
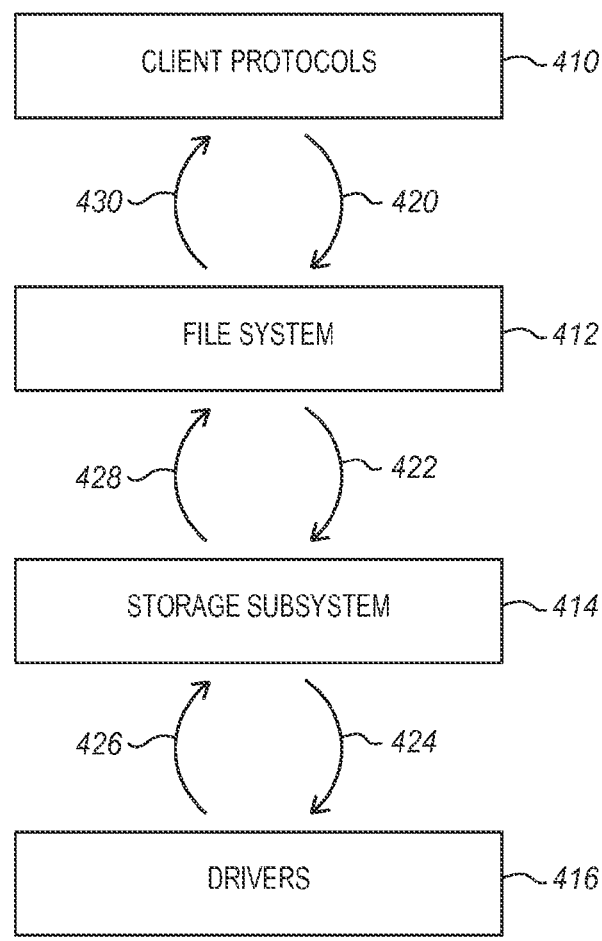
FIG. 4 is a block diagram of a software storage stack according to one embodiment of the invention.

FIG. 4 is a block diagram of a software stack that may be used to implement some embodiments of the invention described above. A set of client protocols 410 generate I/O traffic for the storage system. The clients may be coupled through a server as suggested in FIG. 3 or the client protocols may be coupled to the storage system without an intermediate server. In the illustrated embodiment, the client protocols are coupled to a file system 412, which is coupled to a storage subsystem 414, which is coupled to the storage device drivers 416.

In the software stack, the client protocols send I/O commands and control messages 420 to the file system. The file system sends I/O and control 422 to LUNs of the storage subsystem and the storage subsystem sends corresponding I/O and control 424 to the storage devices through the drivers. At each stage the I/O commands and control information is adapted for the particular stage or level. Similarly in a reverse channel, the device drivers 416 expose 426 the devices to the LUNs. The storage system 414 exposes 428 the LUNs to the file system 412 and the file system is exposed 430 to the client protocols. The software stack carries any I/O and control through the system to serve the clients through the client protocols.

Figure 5:
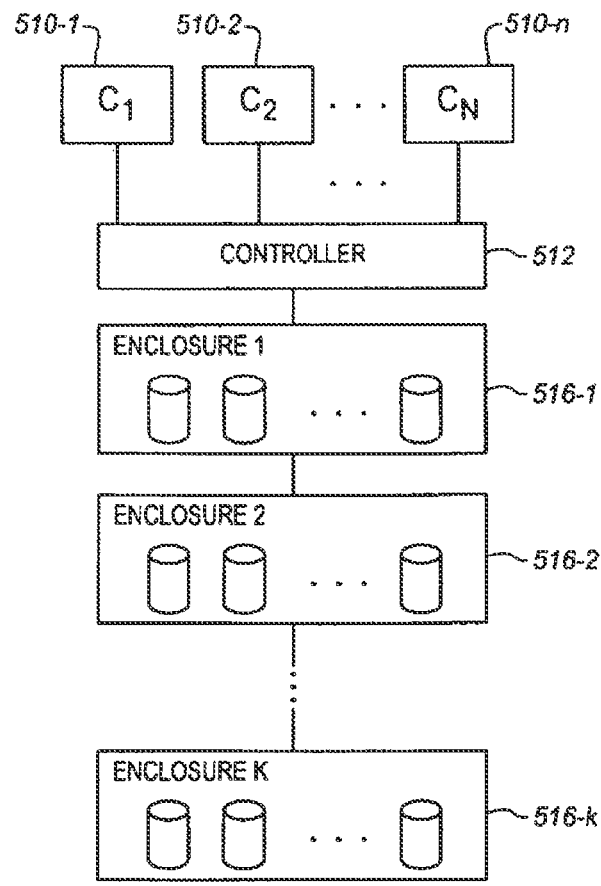
FIG. 5 is a block diagram of a data storage management system according to one embodiment of the invention.

FIG. 5 is a block diagram of another hardware implementation of the systems described above for managing data storage. A number, n, of client devices 510-1, 510-2, ... 510-n are each configured to server different clients and offer archival, backup, or remote storage to its users. The client devices may be co-located or distributed through many different locations. The client devices run client protocols and are coupled through a local or wide area network or some other connection to a controller 512. The controller may be a server as described above or a device to run a file system. The controller provides access for each client device to one or more of the many, k, physical storage devices 516-1, 516-2, ... 516-k.

There may be switches, routers, transcoders, servers, or any number of other devices (not shown) between the client devices 510 and the storage controller 512, depending on the particular implementation. The controller may be coupled through a SAS (Serial Attached SCSI (Small Computer System Interface)), NAS (Network Attached Storage), or any other data storage interface. As shown, each enclosure 516 includes multiple storage devices. The storage devices within a particular enclosure may form a device set or set of storage devices as referred to herein. However, a device set may also be composed of some or all of the storage devices from several different enclosures. Drives from different enclosures allow for greater redundancy and reliability and makes it easier to replace a functional disk for a nonfunctional disk as the system is used.

Figure 6:
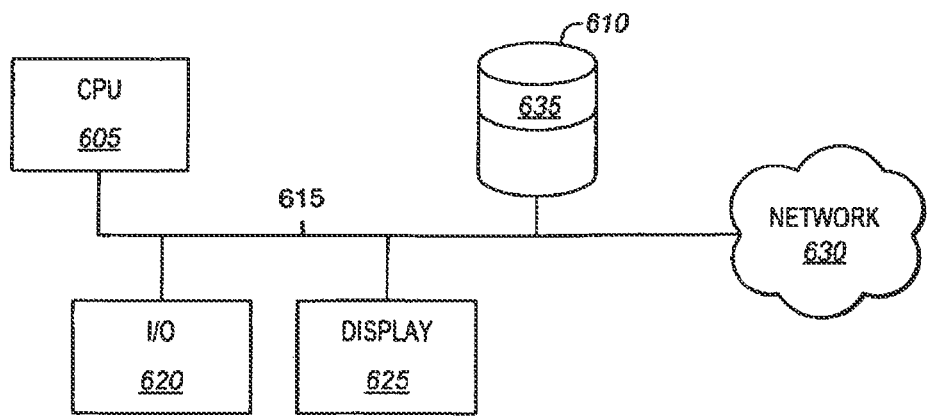
FIG. 6 is a block diagram of an example computer system suitable for implementing aspects of the present invention.

FIG. 6 shows a block diagram illustrating an example computer system 600 according to one embodiment of the invention. The exemplary computer system 600 includes a processor 605 coupled to a storage device 610 by a bus 615. In addition, a number of user input/output devices, such as a keyboard 620 and a display 625, may also be coupled to the bus 615, but are optional parts. A network 630 may also be coupled to bus 615. The processor 210 (single or multi core; and if multi core, symmetrical or asymmetrical cores) includes at least a central processing unit of any type of architecture, such as CISC, RISC, VLIW, or hybrid architecture. The processor 210 may also include a graphics processing unit (e.g., one or more cores), graphic bus interface(s), a memory management unit, and main memory bus interface(s). Furthermore, the processor 210 may be implemented on one or more die within the same chip. The storage device 610 and network traffic represents one or more machine-readable media. Thus, machine-readable media include any mechanism that provides (i.e., stores and/or transmits) information in a form readable by a machine (e.g., a computer). For example, a machine-readable medium may be machine-readable storage media (e.g., magnetic disks; optical disks; random access memory; read only memory; flash memory devices), machine-readable communication media (e.g., electrical, optical, acoustical or other form of propagated signals—such as carrier waves, infrared signals, digital signals, etc.); etc. The bus 615 represents one or more busses and bridges (also termed as bus controllers). While this embodiment is described in relation to a single processor computer system, other embodiments could include a multi-processor computer system. In addition, while this embodiment is described in relation to a 64-bit computer system, other embodiments of the invention include computer systems using other bit widths.

FIG. 6 also illustrates that the storage device 610 has stored therein software 635 for execution on the processor 605 to provide for managing usage and power states of connected storage devices, whether coupled through the network 630 or the bus 615. Of course, the storage device 610 preferably contains additional software such as an operating system and various applications (not shown). The term storage area is used herein to refer to any mechanism for storing data, including locations in the storage device 610, one or more registers in the processor 605, etc.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While embodiments of the invention has been described in relation to a SAS storage drive in an archival storage system, other types of drives for other purposes using different connections may be used. While hard disk drives are presently preferred for speed, capacity and manageability other types of mass storage devices may be used, depending on the desired storage characteristics and further improvements in other types of memory.

Embodiments of the invention have also been described using a file system located on a server or client device and a storage subsystem which may be located on the server or client, on a separate storage controller, or associated with one or more set of storage devices. However, the functions, operations, and connections described above may be implemented using different structures and modules. The particular terminology of file system and storage subsystem may also be modified to apply to similar structures or modules that perform similar function and operations. Therefore, embodiments of the invention are not limited to a file system writing data to a SAS RAID array through a storage subsystem, but may be implemented in a variety of different storage architectures.

In addition, while the flow diagrams in the figures show a particular order of operations performed by certain embodiments of the invention, it should be understood that such order is provided only as an example. Alternative embodiments may perform the operations in a different order, combine certain operations, overlap certain operations, etc.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing a power state of a set of data storage devices (device set) coupled to and controlled by a storage subsystem using a file system, wherein the file system receives read and write requests and passes them to the storage subsystem, the method comprising:
   determining an idleness measure at the file system, the idleness measure indicating availability requirements for a set of logical addresses;
   receiving at the storage subsystem a requested idle state from the file system that is based on the idleness measure;
   determining at the storage subsystem the device set based on the set of logical addresses;
   determining whether to change a current idle state of the device set, the determining being based on information about the device set and the requested idle state; and
   commanding the device set to change the current idle state to correspond to the requested idle state based on determining whether to change the current idle state.

2. The method of claim 1, wherein determining the idleness measure comprises monitoring read and write requests to the device set and then predicting a future data pattern.

3. The method of claim 1, wherein if the idleness measure indicates that there will be no read or write requests to the device set for an extended duration, then the requested idle state received at the storage subsystem is an offline state.

4. The method of claim 1, wherein if the idleness measure indicates that there are pending read and write requests, then the requested idle state received at the storage subsystem is an online state.

5. The method of claim 1, further comprising receiving a higher level process request to power down the device set and wherein determining the idleness measure is in response to receiving the request.

6. The method of claim 1, wherein determining whether to change the current idle state comprises evaluating a reliability measure of the device set.

7. The method of claim 6, wherein evaluating the reliability measure comprises reading usage statistics of the data storage devices of the device set.

8. The method of claim 1, wherein determining whether to change the current idle state comprises evaluating an operational status of the device set.

9. A non-transitory computer-readable storage medium that provides instructions that, if executed by a processor, will cause said processor to perform operations comprising:
   receiving a requested idle state from a file system based on an idleness measure determined by the file system, the idleness measure indicating availability requirements of a set of logical addresses;
   determining a set of data storage devices corresponding to the set of logical addresses;
   determining whether to change a current idle state of the set of data storage devices based on information about the set of data storage devices and the requested idle state; and
   commanding the device set to change the current idle state to correspond to the requested idle state based on determining whether to change the current idle state.

10. The medium of claim 9, wherein the idleness measure determined by the file system is based on having monitored read and write requests to the set of logical addresses and a prediction of a future data pattern.

11. The medium of claim 9, wherein if the idleness measure indicates that there will be no read or write requests to the set of logical addresses for an extended duration, then the requested idle state is an offline state.

12. The medium of claim 9, wherein if the idleness measure indicates that there are pending read and write requests, then the requested idle state is an online state.

13. The medium of claim 9, wherein the requested idle state received from the file system is further based on a higher level process request to power down the data storage devices.

14. An apparatus comprising:
   a file system to determine an idleness measure, the idleness measure indicating availability requirements for a set of logical addresses and to determine a requested idle state based on the idleness measure; and
   a storage subsystem coupled to the file system to receive from the file system the requested idle state, to determine the device set corresponding to the set of logical addresses, to determine whether to change a current idle state of the device set, the determining whether to change being based on information about the device set and the requested idle state, and to command the device set to change the current idle state to correspond to the requested idle state based on determining whether to change the current idle state.

15. The apparatus of claim 14, wherein the file system determines the idleness measure by monitoring read and write requests to the device set and then predicting a future data pattern.

16. The apparatus of claim 15, wherein the file system determines the idleness measure by further monitoring background processes.

17. The apparatus of claim 14, wherein if the idleness measure indicates that there will be no read or write requests to the device set for an extended duration, then the requested idle state is an offline state.

18. The apparatus of claim 14, wherein if the idleness measure indicates that there are pending read and write requests, then the requested idle state is an online state.

19. The apparatus of claim 14, wherein the file system is further to receive a higher level process request to power down the data storage devices and determines the idleness measure in response to receiving the request.

* * * * *